United States Patent
Tung et al.

(10) Patent No.: US 6,900,458 B2
(45) Date of Patent: May 31, 2005

(54) TRANSFLECTIVE DISPLAY HAVING AN OLED BACKLIGHT

(75) Inventors: Yeh-Jiun Tung, West Windsor, NJ (US); Min-Hao Michael Lu, Lawrenceville, NJ (US); Vladimir Bulovic, Lexington, MA (US)

(73) Assignee: Universal Display Corporation, Ewing, NJ (US)

( * ) Notice: Subject to any disclaimer, the term of this patent is extended or adjusted under 35 U.S.C. 154(b) by 43 days.

(21) Appl. No.: 10/371,816

(22) Filed: Feb. 21, 2003

(65) Prior Publication Data

US 2004/0164292 A1 Aug. 26, 2004

(51) Int. Cl.[7] .............................................. H01L 35/24
(52) U.S. Cl. .......................... 257/40; 257/98; 359/254
(58) Field of Search .............................. 257/98, 99, 79, 257/40; 359/254

(56) References Cited

U.S. PATENT DOCUMENTS

| | | | |
|---|---|---|---|
| 4,580,877 A | 4/1986 | Washo | |
| 4,714,983 A | 12/1987 | Lang | |
| 5,211,463 A | 5/1993 | Kalmanash | |
| 5,703,436 A | 12/1997 | Forrest et al. | |
| 5,707,745 A | 1/1998 | Forrest et al. | |
| 5,796,509 A | * 8/1998 | Doany et al. | 359/254 |
| 5,844,363 A | 12/1998 | Gu et al. | |
| 5,886,681 A | 3/1999 | Walsh et al. | |
| 5,920,080 A | 7/1999 | Jones | |
| 5,965,907 A | 10/1999 | Huang et al. | |
| 6,008,871 A | 12/1999 | Okumura | |
| 6,025,644 A | 2/2000 | Imaeda | |
| 6,303,238 B1 | 10/2001 | Thompson et al. | |
| 2002/0033908 A1 | 3/2002 | Mori et al. | |
| 2002/0085143 A1 | 7/2002 | Kim et al. | |
| 2002/0163606 A1 | 11/2002 | Kitai et al. | |
| 2002/0197511 A1 | 12/2002 | D'Andrade et al. | |
| 2003/0030371 A1 | 2/2003 | Liao et al. | |

FOREIGN PATENT DOCUMENTS

| | | |
|---|---|---|
| EP | 1 046 944 | 10/2000 |
| GB | 2 332 082 | 6/1999 |
| WO | WO 97/38347 | 10/1997 |
| WO | WO 01/79924 | 10/2001 |

OTHER PUBLICATIONS

E. Lueder et al., "The Combination of a Transflective FLCD for Daytime Use With an OLED for Darkness", 2000 Society for Information Display (SID) International Symposium Digest, pp. 1025–1027.

I. Lewin, "Backlighting for Direct View LCDs", Information Display, vol. 13, No. 11, pp. 32–36, Nov. 1997.

(Continued)

Primary Examiner—Sara Crane
(74) Attorney, Agent, or Firm—Kenyon & Kenyon

(57) ABSTRACT

A device is provided. The device has a first electrode comprising a reflective material, and a second electrode disposed over the first electrode, the second electrode comprising a transmissive material. An organic layer including an emissive material is disposed between the first electrode and the second electrode. A light modulating element is disposed over the second electrode. In one embodiment, the first electrode is the only significantly reflective layer in the device. In another embodiment, the first and second electrodes and the organic layer are fabricated over the light modulating element, and the second electrode is reflective, not the first electrode. Color filters may be used to achieve a full-color display. Organic light emitting devices may be used that emit a broad spectra of light, such as white light. Organic light emitting devices that emit a single color of light may be used. Different organic light emitting devices that emit different spectra of light may be used.

8 Claims, 5 Drawing Sheets

OTHER PUBLICATIONS

J. Kido et al., "Multilayer White Light–Emitting Organic Electroluminescent Device", Science vol. 267, No. 5202, pp. 1332–1334 (Mar. 3, 1995).

www.techweb.com, May 10, 2000.

N. Ogawa et al., "Field–Sequential–Color LCD Using Switched Organic EL Backlighting", SID 99 Digest, pp. 1098–1101, 1999.

Lee et al., "Development of the new structure of transflective LCD", Korean Information Display Society (KIDS) International Meeting on Information Display Digest (IMID) 2001, Session A8.3.

U.S. Appl. No. 10/290,656, filed Nov. 8, 2002, entitled "Organic Light Emitting Materials and Devices".

U.S. Appl. No. 10/219,759, filed Aug. 16, 2002, entitled "Organic Light Emitting Devices For Illumination".

U.S. Appl. No. 10/328,914, filed Dec. 24, 2002, entitled "White Light Emitting Oleds From Combined Monomer And Aggregate Emission".

* cited by examiner

TRANSFLECTIVE DISPLAY HAVING AN OLED BACKLIGHT

RESEARCH AGREEMENTS

The claimed invention was made by, on behalf of, and/or in connection with one or more of the following parties to a joint university-corporation research agreement: Princeton University, The University of Southern California, and the Universal Display Corporation. The agreement was in effect on and before the date the claimed invention was made, and the claimed invention was made as a result of activities undertaken within the scope of the agreement.

FIELD OF THE INVENTION

The present invention relates to organic light emitting devices (OLEDs), and more specifically to transflective displays using OLEDs as a backlight.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

OLED devices are generally (but not always) intended to emit light through at least one of the electrodes, and one or more transparent electrodes may be useful in an organic opto-electronic devices. For example, a transparent electrode material, such as indium tin oxide (ITO), may be used as the bottom electrode. A transparent top electrode, such as disclosed in U.S. Pat. Nos. 5,703,436 and 5,707,745, which are incorporated by reference in their entireties, may also be used. For a device intended to emit light only through the bottom electrode, the top electrode does not need to be transparent, and may be comprised of a thick and reflective metal layer having a high electrical conductivity. Similarly, for a device intended to emit light only through the top electrode, the bottom electrode may be opaque and/or reflective. Where an electrode does not need to be transparent, using a thicker layer may provide better conductivity, and using a reflective electrode may increase the amount of light emitted through the other electrode, by reflecting light back towards the transparent electrode. Fully transparent devices may also be fabricated, where both electrodes are transparent. Side emitting OLEDs may also be fabricated, and one or both electrodes may be opaque or reflective in such devices.

As used herein, "top" means furthest away from the substrate, while "bottom" means closest to the substrate. For example, for a device having two electrodes, the bottom electrode is the electrode closest to the substrate, and is generally the first electrode fabricated. The bottom electrode has two surfaces, a bottom surface closest to the substrate, and a top surface further away from the substrate. Where a first layer is described as "disposed over" a second layer, the first layer is disposed further away from substrate. There may be other layers between the first and second layer, unless it is specified that the first layer is "in physical contact with" the second layer. For example, a cathode may be described as "disposed over" an anode, even though there are various organic layers in between.

A "transflective" display is capable of operating in both transmissive and reflective modes. In the reflective mode, ambient light reflected by elements within the display provides an image to a viewer. A reflective mode may be particularly advantageous for certain applications, such as a laptop display that may be used outside during daylight, which might obscure the images generated by a display that does not have a reflective mode. A transmissive mode is advantageous for such a display in a different environment, for example when there is less ambient light. In the transmissive mode, the light used to provide the image is generated by a "backlight." Examples of transflective displays are provided in Lueder et al., "The Combination of a Transflective FLCD for Daytime Use With An OLED for Darkness," 2000 Society for Information Display (SID) Symposium Digest, 1025–1027, and Lee et al., "Development of the new structure of transflective LCD," Korean Information Display Society (KIDS) International Meeting on Information Display Digest (IMID) 2001, Session A8.3.

SUMMARY OF THE INVENTION

A device is provided. The device has a first electrode comprising a reflective material, and a second electrode disposed over the first electrode, the second electrode comprising a transmissive material. An organic layer including an emissive material is disposed between the first electrode and the second electrode. A light modulating element is disposed over the second electrode. In one embodiment, the first electrode is the only significantly reflective layer in the device. In another embodiment, the first and second electrodes and the organic layer are fabricated over the light modulating element, and the second electrode is reflective, not the first electrode. Color filters may be used to achieve a full-color display. Organic light emitting devices may be used that emit a broad spectra of light, such as white light. Organic light emitting devices that emit a single color of light may be used. Different organic light emitting devices that emit different spectra of light may be used.

DETAILED DESCRIPTION

Figure 1:
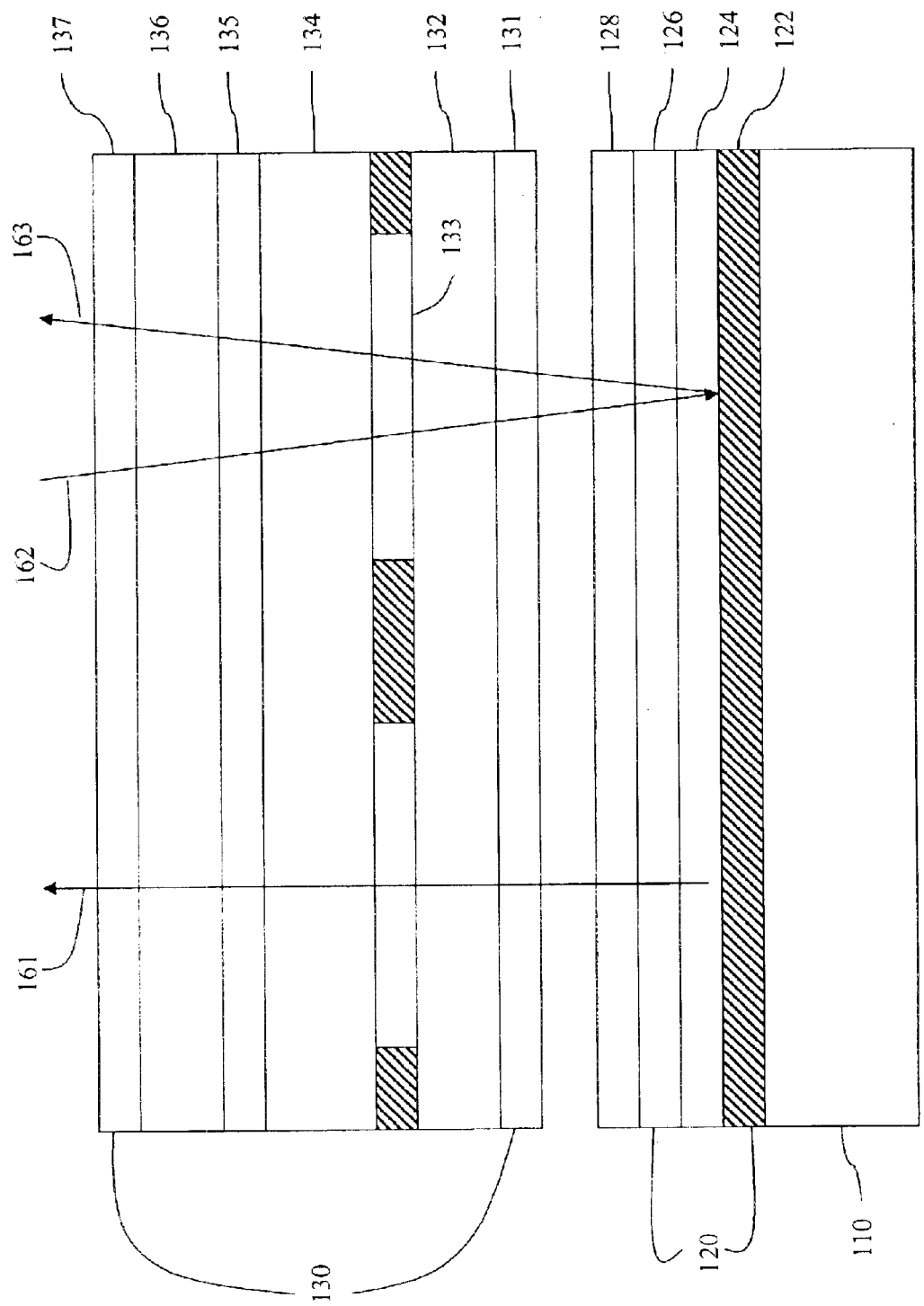
FIG. 1 shows a transflective device fabricated in accordance with an embodiment of the invention.

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

More details on OLEDs, such as preferred materials and fabrication methods, may be found in U.S. patent application Ser. No. 10/290,656, "Organic Light Emitting Materials and Devices," filed on Nov. 8, 2002, which is incorporated by reference in its entirety. Embodiments of the present invention may use any type of OLED, such as phosphorescent or fluorescent, flexible or rigid, processed by any suitable method such as solution processing or vapor deposition, any other variation, or any combination thereof.

It is possible to fabricate OLEDs that emit white light. One OLED configuration that emits white light involves several discrete devices that emit separate colors of light, such as red, green, and blue, that are spaced closely together such that a viewer can not distinguish the different colors. More details on such an OLED may be found in U.S. patent application Ser. No. 10/219,759, filed on Aug. 16, 2002, which is incorporated by reference in its entirety, at pages 3–15. Another OLED configuration that emits white light is a single device that includes a variety of different emissive molecules that emit different colors of light, such that the combination is white. More details on such an OLED may be found in U.S. patent application Ser. No. 10/144,419 to D'Andrade et al, filed on May 13, 2002, which is incorporated by reference in its entirety, at pages 5–33. Yet another OLED configuration that emits white light has a single emissive layer with a single emissive molecule that may emit in different modes, such as monomer and dimer emission. By selecting the concentration of the emissive molecule, it is possible to achieve white light. More details on such an OLED, and other white-emitting OLEDs, may be found in U.S. patent application Ser. No. 10/328,914, filed on Dec. 24, 2002, which is incorporated by reference in its entirety, at pages 5–36. Other OLED structures capable of emitting white light may also be used.

In a conventional transflective display, there is generally a "transflective layer" disposed between the backlight on one hand, and the viewer and ambient light source on the other. This transflective layer must therefore be capable of transmitting light from the backlight to the viewer, and also be capable of reflecting light from an ambient light source to the viewer. Such a transflective layer may include a reflective material having holes therein, such that the holes transmit light from the backlight, while the layer itself reflects ambient light, as disclosed in Lee et al. Or, the transflective may comprise a material deposited to a particular thickness such that it reflects a portion of the light incident upon it, while simultaneously transmitting a portion of the light incident upon it. For example, Lueder et al. discloses an aluminum layer having a particular thickness that results in 80% reflection and 20% transmission of light. It is believed that most conventional transflective displays have a transflective layer optimized for the reflective mode, such that the reflectivity is about 70–80%, and would certainly be above 40% reflectivity.

Embodiments of the present invention do not use a partially transmissive and partially reflective transflective layer. Instead, the backlight, the ambient light that may be reflected, and the viewer are all disposed to one side of a reflective layer. Because the backlight is not behind the reflective layer, it is not necessary that the reflective layer transmit light in addition to reflecting light. As a result, the efficiency of the device in the transmissive mode may be greatly improved as compared to a conventional transflective device. Conventional transflective devices generally lose a substantial portion of the light from the backlight as the light passes through the transflective layer. Embodiments of the present invention do not have this problem, because the layer that reflects light in the reflective mode is located behind the backlight, not between the backlight and the viewer, such that light does not need to pass through a partially reflective or "transflective" layer in the transmissive mode. As a result, there is no need to compromise between the reflective and transmissive properties of a transflective layer. In addition, the reflective layer may be as reflective as possible, up to 100% reflective, because there is no need to allow light from a backlight to pass through the reflective layer. As a result, performance in the reflective mode may be improved. This improvement in the reflective mode may be offset to some degree if light in the reflective mode passes through additional layers of the device in order to reach the reflective layer, as compared to a conventional device. Lower reflectivities, while less desirable, may be used. To the extent that light in the reflective mode is attenuated too much, the reflective mode may be supplemented by the transmissive mode. During such supplementation, the OLED backlight may or may not be driven at full power, depending upon the amount of light from the transmissive mode that is needed. Layers other than a transflective layer may have some reflectivity, although such reflectivity is generally undesirable. The layer having the greatest such reflectivity in an OLED is generally the transparent electrode, which may reflect up to 30% of incident light. Such a layer would generally have a reflectivity lower than about 40%.

FIG. 1 shows a transflective device fabricated in accordance with an embodiment of the invention. A reflective first electrode 122, an organic layer 124 and a transmissive second electrode 126 are disposed, in that order, over a first substrate 110. It is understood that each of these layers may comprise multiple sublayers, as known to the art. For example, the electrodes may be compound electrodes with multiple layers. Organic layer 124 may comprise multiple sublayers, including transport layers, blocking layers, injection layers, and other layers known to the art. Organic layer 124 includes at least one emissive material that is capable of emitting light when a voltage is applied between electrodes 122 and 126. Together, electrodes 122 and 126 along with organic layer 124 comprise an organic light emitting device 120.

Preferably, organic light emitting device 120 is encapsulated with an encapsulant 128 in order to protect the organic layer 124 from exposure to the elements. The encapsulant may be a thin film. A preferred encapsulant includes alternating layers of a polymer such as polyacrylate and a dielectric material such as aluminum oxide, and is commercially available from Vitex Systems, Inc. of San Jose, Calif. In one embodiment, organic light emitting device 120 is laminated to light modulating element 130. In such an embodiment, the encapsulant may protect organic light emitting device 120 during such lamination, and may allow for a closer coupling of organic light emitting device 120 and light modulating element 130 than may otherwise be achieved. An encapsulant also allows for good device lifetimes without the use of a subsequent hermetic seal. Using an encapsulant, a total thickness between first electrode 122 and light modulating element 130 of about 10 microns or less may be achievable. The encapsulant may also be selected to enhance the optical properties of the device, for example by matching indices of refraction. If an encapsulant is not used, organic light emitting device 120 is preferably protected in another way, such as an epoxy seal around the perimeter of organic light emitting device 120 and light modulating element 130. A layer that alters optical properties may be used even if it is not an encapsulant. An encapsulant may be used in any embodiment of the invention.

A light modulating element 130 is disposed over organic light emitting device 120. Light modulating element 130 is capable of modulating the passage of light. FIG. 1 illustrates one common light modulating element, a liquid crystal element. Light modulating element 130 further comprises a first polarizer 131, a second substrate 132, a third electrode 133, a liquid crystal 134, a fourth electrode 135, a third substrate 136, and a second polarizer 137, arranged in that order. First polarizer 131 and second polarizer 137 are oriented such that they are polarized at a 90 degree angle. First electrode 133 and second electrode 135 have brushed surface, such that direction of the brushing of first electrode 133 is rotated 90 degrees from the angle of brushing of second electrode 135. Typically first electrode 133 is patterned and second electrode 135 is an unpatterned blanket electrode, but other configurations may be used. When no voltage is applied between third and fourth electrodes 133 and 135, liquid crystal 134 orients itself such that there is a gradual rotation in the crystal structure through 90 degrees between third electrode 133 and fourth electrode 135. A a result, light passes through second polarizer 137 and is polarized in a particular direction. This polarization direction rotates through 90 degrees as the light passes through liquid crystal 135, such that the light may then pass through polarizer 133. When a voltage is applied between third electrode 133 and fourth electrode 135, liquid crystal 134 orients itself in the direction of the applied field, such that the polarity of light passing through liquid crystal 134 does not change its polarity. As a result, light passing through second polarizer 137 is polarized in a particular direction. When the light reaches first polarizer 132, it can not pass through because polarizer 132 is polarized at 90 degrees from polarizer 137. In short, light modulating element 130 allows light to pass when no voltage is applied between third electrode 133 and fourth electrode 135, but does not allow light to pass when a voltage is applied.

FIG. 1 shows a specific configuration of light modulating element 130. Those of skill in the art understand that there are many different types of light modulating elements. The order of the components of light modulating element 130 may be altered. Some elements may be omitted entirely, or have their function combined with other elements. By orienting the polarizers differently than described above, a light modulating element may be fabricated that passes light when a field is applied and blocks light when no field is applied (a "normally dark" element), as opposed to the "normally light" element described above. Many light modulating elements include liquid crystals and polarizers, but some do not. Embodiments of the present invention include any light modulating element, even those not specifically illustrated or described. Light modulating element 130 may be pixelated, such that the individual pixels may be controlled to either transmit or block light, using techniques known to the art, to form a display. As illustrated in FIG. 1, one way of achieving such pixelation is by patterning third and fourth electrodes 133 and 135. FIG. 1 is illustrated with a small space between OLED 120 and 130 to more clearly illustrate the different components of the device. Other Figures may have similar spaces. This space may not be present in an actual device, and in fact a preferred embodiment has top electrode 126 in direct contact with first polarizer 131. In some embodiments, the layers separated by the space may be separately fabricated and subsequently laminated or otherwise attached together.

The device of FIG. 1 is "transflective" because it may operate in both a transmissive and a reflective mode. Arrow 161 illustrates the transmissive mode. When a voltage is applied between electrodes 122 and 126, OLED 120 emits light. Where light modulating element 130 is transmissive, the light is transmitted through light modulating element 130 to a viewer. Where light modulating element 130 is not transmissive, the light is blocked. Because light modulating element 130 determines where light is transmitted and where light is blocked, a display that may form images is possible even where OLED 120 is a simple blanket OLED that is not patterned.

Arrows 162 and 163 illustrate the reflective mode. Ambient light incident upon the device is illustrated by arrow 162. Where light modulating element 130 is transmissive, the light is transmitted through light modulating element 130 to first electrode 122, which is reflective. The light is then reflected, and transmitted back through light modulating element 130 to a viewer. Where light modulating element 130 is not transmissive, the incident light is blocked. Preferably, OLED 120 does not emit light when the device is operating in the reflective mode. However, OLED 120 may emit light, such that the device operates in the reflective mode and the transmissive mode at the same time.

OLED 120, and the OLEDs of other embodiments, may incorporate various features to improve OLED performance. One such feature is a bus line. Bus lines are preferred for embodiments having large OLED electrodes, because the lateral conductivity of such electrodes across large distances may not be sufficient to deliver the desired current. Bus lines solve this problem by providing an alternate route for current in lateral directions.

Another such feature is a diffuser. A diffuser may be used to avoid mirror-like reflection that may otherwise occur. For example, if first electrode 122 is a specular reflector, a viewer looking at the device may be able to see a reflection of his own image. But, if electrode 122 is a diffuse reflector, such an image may not be visible. A diffuser may be incorporated at various places in the device, including the use of a separate diffuser layer. A preferred way is to use an electrode 122 that provides diffuse reflection, without the use of a separate diffuser layer.

A significant parameter is the distance between first electrode 122 and light modulating element 130. It is preferable to minimize this distance, particularly in order to minimize the loss of light in the reflective mode, as the light travels this distance twice. In addition, if the distance is too great, there may be cross-talk between pixels, particularly in the reflective mode. Preferably, the distance between first electrode 122 and light modulating element is less than about 90 microns. More preferably, the distance is less than about 10 microns. A distance of 10 microns or less may be achievable with the use of an encapsulant. Embodiments of the invention may involve greater distances between first electrode 122 and light modulating element 130, but the smaller distances are preferred.

Figure 2:
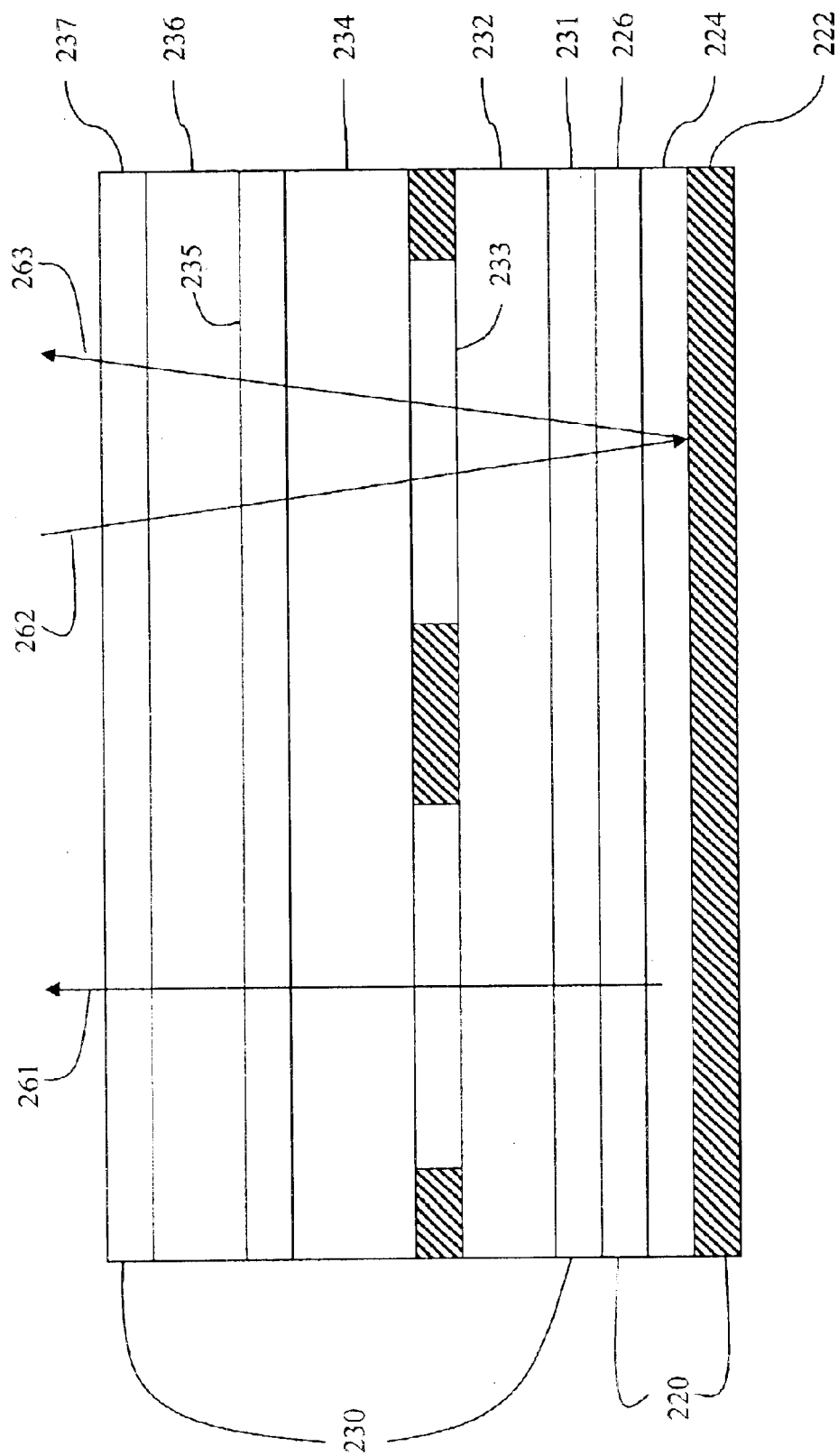
FIG. 2 illustrates an embodiment of the invention where a light modulating element is used as a substrate upon which an OLED is fabricated.

FIG. 2 illustrates an embodiment where light modulating element 230 is used as a substrate upon which OLED 220 is fabricated. As a result, there is no need for a substrate analagous to substrate 110 in the device of FIG. 2. OLED 220 includes a transmissive second electrode 226, an organic layer 224, and a reflective first electrode 222, disposed in that order, over light modulating element 230, and analogous to second electrode 126, organic layer 124, and first electrode 122 of FIG. 1. First electrode 222 may be considered a "top" electrode with respect to second electrode 226, whereas first electrode 122 may be considered a "bottom" electrode with respect to second electrode 126, because light modulating element 230 acts as the substrate upon which OLED 220 is fabricated, whereas OLED 120 is fabricated upon substrate 110. OLED 220 may therefore be considered a "bottom-emitting" OLED, whereas OLED 120 may be considered a "top-emitting" OLED.

Light modulating element 230 includes a first polarizer 231, a first substrate 232, a third electrode 233, a liquid crystal 234, a fourth electrode 235, a second substrate 236, and a second polarizer 237, which are analogous to first polarizer 131, second substrate 132, third electrode 133, liquid crystal 134, fourth electrode 135, third substrate 136, and second polarizer 137, respectively, of FIG. 1. The device of FIG. 2 operates analogously to the device of FIG. 1, as illustrated by arrows 261, 262 and 263.

Figure 3:
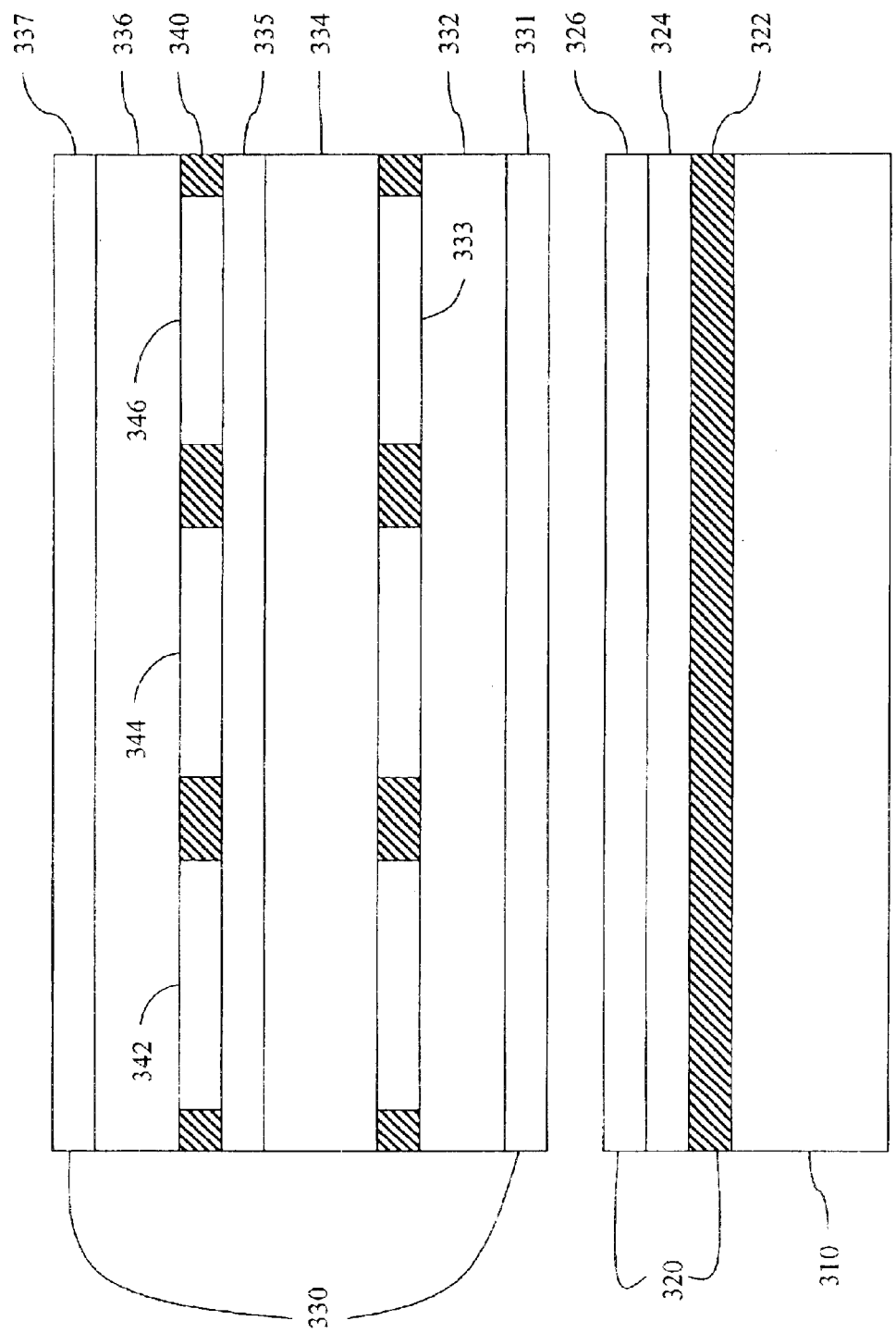
FIG. 3 shows an embodiment of the invention having a color filter.

FIG. 3 shows an embodiment of the invention having a color filter 340. The device of FIG. 3 includes an OLED 320 and a light modulating element 330, disposed in that order over a first substrate 310. OLED 320 includes a reflective first electrode 322, an organic layer 324, and a transmissive second electrode 326, disposed in that order, over first substrate 310, and analogous to first electrode 122, organic layer 124, and second electrode 126 of FIG. 1. Light modulating element 320 includes a first polarizer 331, a second substrate 332, a third electrode 333, a liquid crystal 334, a fourth electrode 335, a third substrate 336, and a second polarizer 337, analogous to first polarizer 131, second substrate 132, third electrode 133, liquid crystal 134, fourth electrode 135, third substrate 136, and second polarizer 137 of FIG. 1. A color filter 340 is disposed within light modulating element 330, disposed between fourth electrode 335 and third substrate 336.

The embodiment of FIG. 3 enables a full-color transflective OLED display. Color filter 340 may have different regions capable of passing different spectra of light. For example, region 342 may pass blue light, region 344 may pass green light, and region 346 may pass red light. As a result, region 342 may define a blue subpixel, region 344 may define a green subpixel, and region 346 may define a red subpixel. Together, the regions form a full color pixel. Multi-color devices are enabled in both the reflective and transmissive mode. In the reflective mode, the light passes through the color filter twice, once on the way in and once on the way out, such that only the color of light passed by the filter is visible to a viewer. As described in more detail with respect to the embodiments of FIGS. 1 and 2, light modulating element 330 controls whether light incident on the device is blocked such that a pixel (or sub-pixel) is "off," or is allowed to pass such that the pixel (or subpixel) is "on." In the transmissive mode, the embodiment of FIG. 3 may use an OLED 320 that emits a wide spectrum of light, including blue, green and red components. OLED 320 need not be patterned in order to form a pixelated display, because light modulating element 330 is patterned into pixels, and determines where the light emitted by OLED 320 is blocked, and where such light passes. The individual pixels (or subpixels) of light modulating element 330 may be referred to as individual light modulating elements. Light from OLED 320 is filtered by color filter 340 prior to reaching a viewer. As illustrated in FIG. 3, color filter 340 may be patterned into different regions that pass different spectra of light, such that a full color pixel may be achieved in the transmissive mode even though OLED 320 is not necessarily patterned into different regions that emit different spectra of light, as well as in the reflective mode.

Figure 4:
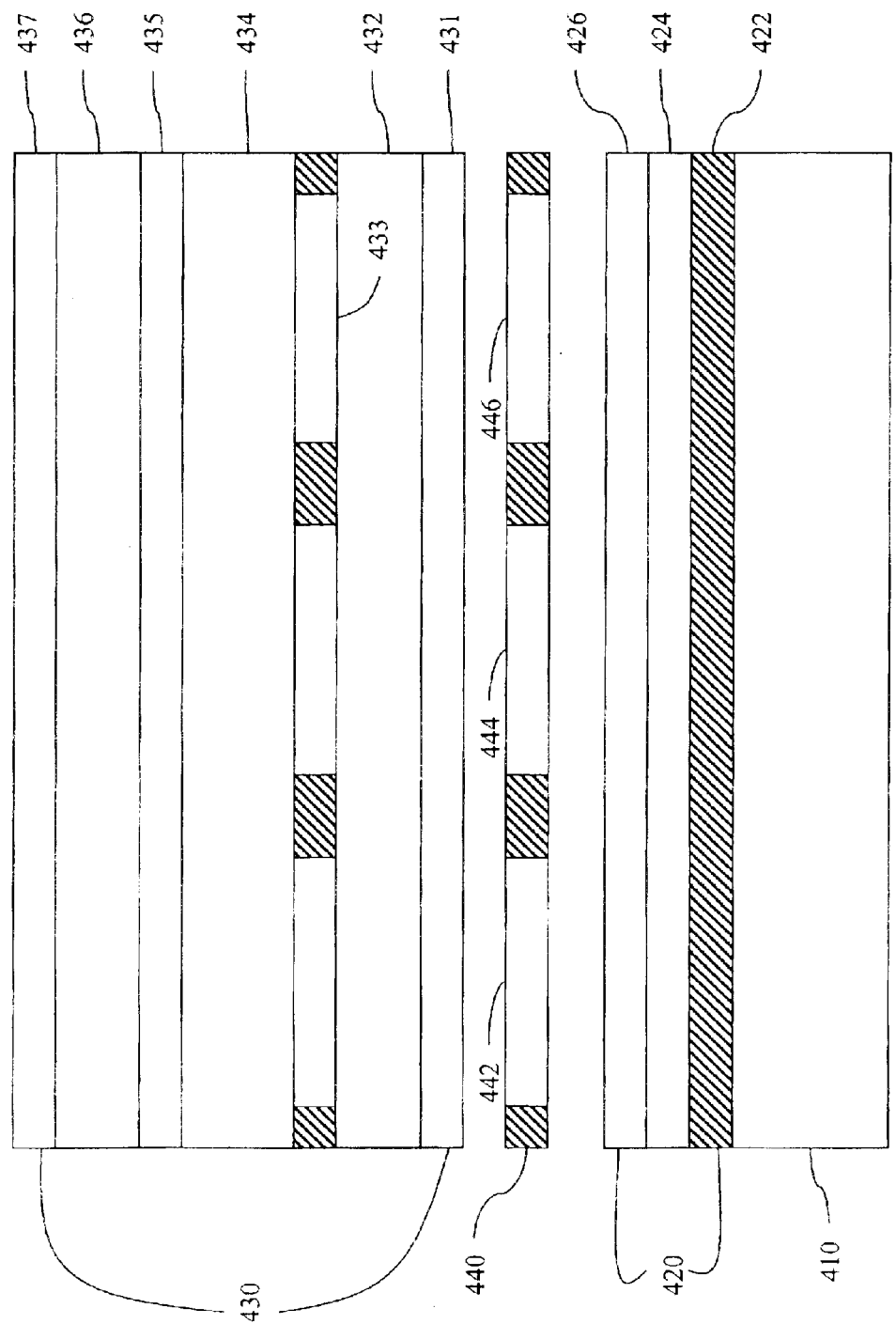
FIG. 4 shows an embodiment of the invention similiar to that of FIG. 3, and illustrates how a color filter may be disposed at different locations within the device.

FIG. 4 shows an embodiment similiar to that of FIG. 3, and provides an example of how a color filter may be disposed at different locations within the device. The device of FIG. 4 operates in a manner analogous to that of FIG. 3. The device of FIG. 4 may be used to achieve a full-color display in both the transmissive and reflective modes.

The device of FIG. 4 includes an OLED 420, a color filter 440, and a light modulating element 430, disposed in that order over a first substrate 410. OLED 420 includes a reflective first electrode 422, an organic layer 424, and a transmissive second electrode 426, disposed in that order, over first substrate 410, and analogous to first electrode 122, organic layer 124, and second electrode 126 of FIG. 1. Light modulating element 420 includes a first polarizer 431, a second substrate 432, a third electrode 433, a liquid crystal 434, a fourth electrode 435, a third substrate 436, and a second polarizer 437, analogous to first polarizer 131, second substrate 132, third electrode 133, liquid crystal 134, fourth electrode 135, third substrate 136, and second polarizer 137 of FIG. 1. Color filter 440 may be patterned into regions 442, 444, and 446 that are capable of passing different spectra of light, analogous to regions 342, 344 and 346 of FIG. 3.

Figure 5:
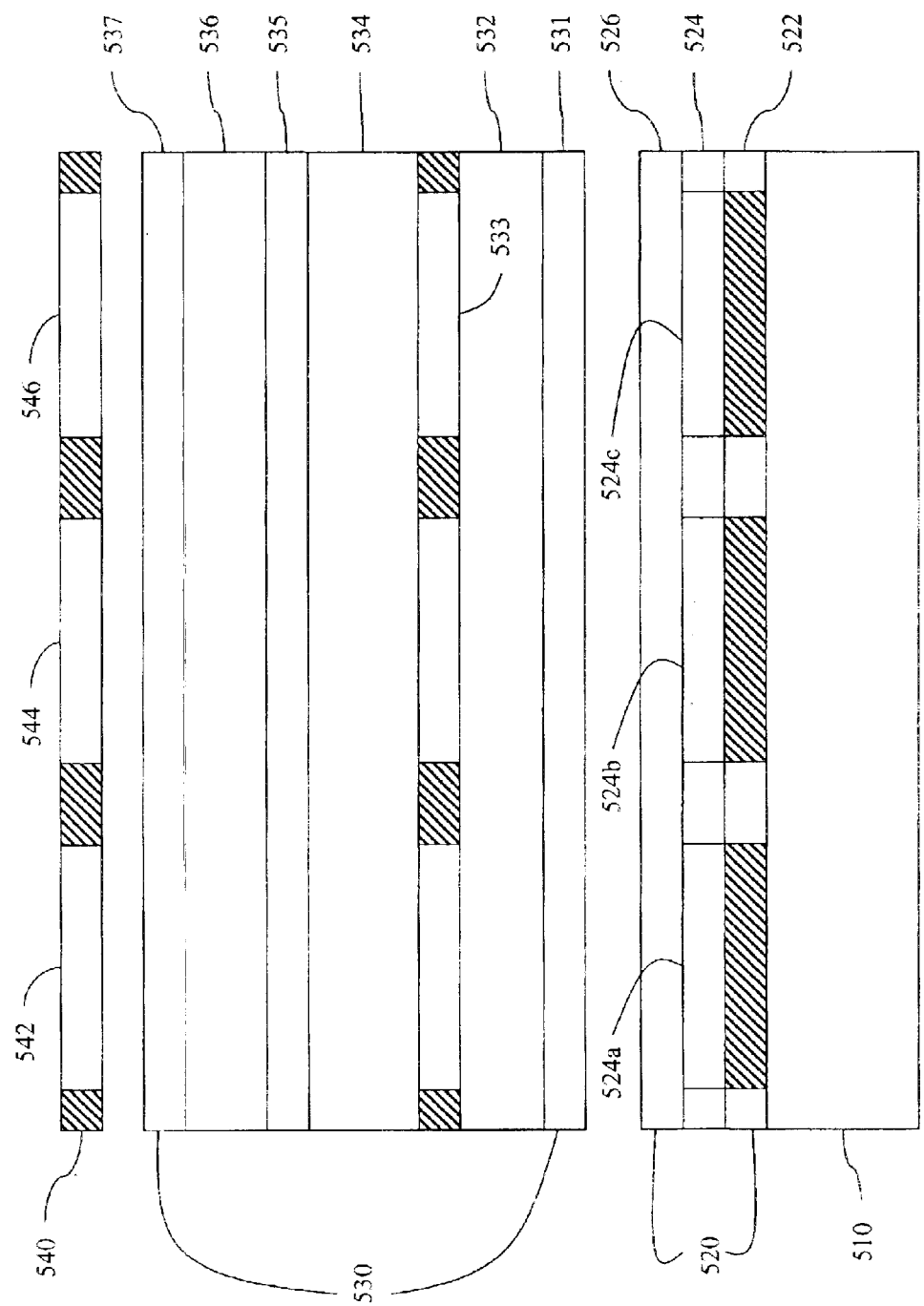
FIG. 5 shows an embodiment of the invention having patterned OLEDs that may be capable of emitting different spectra of light.

A color filter typically has a thickness of about 1–2 microns, although a wider range of thicknesses may be used. A filter that is too thick may attenuate light of the color that is supposed to pass through the filter. A filter that is too thin may not sufficiently block light that is not supposed to pass through the filter. Substrates that are used to form a light modulating element may have a thickness of about 200–300 microns, although a broader range of thicknesses may be used. A substrate that is too thin may not have sufficient structural integrity. A substrate that is too thick may undesirably attenuate the intensity of light passing through the substrate. Although specific embodiments show color filters in specific locations, a color filter may be located in other positions as well FIG. 5 shows an embodiment of the invention having patterened OLEDs that may be capable of emitting different spectra of light. The device of FIG. 5 operates in many ways analogous to the device of FIG. 3. The device of FIG. 5 may be used to achieve a full-color display in both the transmissive and reflcetive modes. Through the use of patterned OLEDs capable of emitting different spectra of light, the embodiment of FIG. 5 may have a high efficiency in the transmissive mode.

The device of FIG. 5 includes an OLED 520, a light modulating element 530, and a color filter 540, disposed in that order over a first substrate 510. OLED 520 includes a reflective first electrode 522, an organic layer 524, and a transmissive second electrode 526, disposed in that order, over first substrate 510, and analogous to first electrode 122, organic layer 124, and second electrode 126 of FIG. 1. Light modulating element 520 includes a first polarizer 531, a second substrate 532, a third electrode 533, a liquid crystal 534, a fourth electrode 535, a third substrate 536, and a second polarizer 537, analogous to first polarizer 131, second substrate 132, third electrode 133, liquid crystal 134, fourth electrode 135, third substrate 136, and second polarizer 137 of FIG. 1. Color filter 440 may be patterned into regions 442, 444, and 446 that are capable of passing different spectra of light, analogous to regions 342, 344 and 346 of FIG. 3.

OLED 520 may be further patterned into separate devices capable of emitting different spectra of light. First emissive layer 524a, second emissive layer 524b, and third emissive layer 524c may each include different emissive molecules, such that each emissive layer is capable of emitting a different spectra of light. For example, first emissive layer 524a, second emissive layer 524b, and third emissive layer 524c may emit blue, green, and red spectra of light, respectively. For efficient operation in the transmissive mode, color filter 540 may be patterned into regions 542, 544, and 546, respectively, that pass a spectra of light similar to that emitted by the underlying emissive region. For example, regions 542, 544 and 546 may pass blue, green, and red spectra of light, respectively, to correspond to the emission of emissive layers 524a, 524b, and 524c.

The device of FIG. 5 may be particularly efficient in the transmissive mode. If the spectra emitted by emissive layers 524a, 524b and 524c correspond closely to the spectra passed by regions 542, 544 and 546, then very little light is lost in the transmissive mode due to color filter 540. As a result, the embodiment of FIG. 5 may be preferred for certain uses, such as where efficiency is important. By way of contrast, a device such as the device of FIG. 3, having a single color backlight such as a white backlight, may lose significant light in the transmissive mode due to a color filter. For example, the red and green components of a white light are lost when the light passes through a color filter that only passes blue light. However, the reduced need for patterning an OLED that emits a single spectra of light, such as white light, may make such a device preferred for certain uses, such as where fabrication costs are important.

Although OLED 520 is patterned into separate OLEDs, whether a particular pixel emits light in the transmissive mode may be controlled by light modulating element 520. As a result, there may not be a need to fabricate circuitry to control the OLEDs on an individual basis—it is sufficient to be able to turn all of the OLEDs on or off as a group. As a result, fabrication costs may be significantly lower when compared to OLEDs having circuitry to control individual OLEDs. Although, in some embodiments, circuitry to control the OLEDs on an individual basis may be used.

Other embodiments using color filters are also within the scope of the invention. For example, a monochrome display that emits a single desired color of light may be achieved by using a color filter 340 in which all of the regions pass the same spectra of light. Such a filter is useful in the reflective mode if a spectra of light different from ambient light is desired, such as a display that appears green where the display is operated in reflective mode in daylight. In the transmissive mode of a monochrome display, the OLED preferably emits the desired spectra of light such that the filter absorbs minimal light, such that effieciency is high in the transmissive mode. However, the color filter may still be present because it is desirable for the reflective mode.

It is understood that the various embodiments described herein are by way of example only, and are not intended to limit the scope of the invention. For example, many of the materials and structures described herein may be substituted with other materials and structures without deviating from the spirit of the invention. Features of the various embodiments may be incorporated into other embodiments. It is understood that various theories as to why the invention works are not intended to be limiting. While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art.

What is claimed is:

1. A device comprising:
   a first electrode, the first electrode comprising a reflective material;
   a second electrode disposed over the first electrode, the second electrode comprising a transmissive material;
   an organic layer including an emissive material disposed between the first electrode and the second electrode; and
   a light modulating element disposed over the second electrode;
   wherein the first electrode is only layer in the device having a reflectivity greater than about 40%.

2. The device of claim 1, further comprising a color filter disposed over the light modulating element.

3. The device of claim 1, further comprising a color filter disposed between the light modulating element and the second electrode.

4. The device of claim 1, wherein the distance between the first electrode and the light modulating element is less than about 90 microns.

5. The device of claim 1, wherein the distance between the first electrode and the light modulating element is less than about 10 microns.

6. The device of claim 1, wherein the organic layer is capable of emitting white light.

7. The device of claim 1, further comprising a substrate disposed under the first electrode, and wherein there is no substrate disposed between the first electrode and the light modulating element.

8. The device of claim 1, wherein the light modulating element includes a first polarizing layer, and the first polarizing layer is in direct contact with the second electrode.

* * * * *